Nov. 10, 1970　　M. T. MOLDOVAN, JR　　3,539,776

REMOVABLE POINTER FOR VOTING MACHINES OR THE LIKE

Filed Oct. 6, 1969

INVENTOR.
MICHAEL T. MOLDOVAN JR.

BY

Bean & Bean
ATTORNEYS

United States Patent Office 3,539,776

Patented Nov. 10, 1970

3,539,776 REMOVABLE POINTER FOR VOTING MACHINES OR THE LIKE

Michael T. Moldovan, Jr., Jamestown, N.Y., assignor to AVM Corporation, Jamestown, N.Y.

Continuation-in-part of application Ser. No. 780,134, Nov. 29, 1968. This application Oct. 6, 1969, Ser. No. 683,933

Int. Cl. G07c 13/00

U.S. Cl. 235—54

4 Claims

ABSTRACT OF THE DISCLOSURE

A voting machine pointer comprising a mounting hub portion coupled by a drive shaft to a vote registering device and a lever arm portion removably carried on the mounting hub portion. The lever arm portion features a "dog-leg" shaped front view configuration terminating at its free end in a main arrowhead shaped portion having at one angular side thereof a forwardly extending flange which is also arrowhead shaped in front view. When the pointer is in a non-voted position it is substantially concealed behind a cover device and only the flange portion of the lever arm projects beyond the cover device such that it is available for manual actuation of the pointer. When in this position, the flange portion points toward an indicia bearing plaque corresponding to the vote selection which will be registered upon pulling against the flange, so as to swing the lever arm portion from behind the cover device into voted position. When the lever arm is swung into voted position the main arrowhead shaped portion thereof exits from behind the cover device and points directly at the same indicia bearing plaques thereby visually confirming to the voter that his intended vote selection has been made. The cover device is removably mounted on the machine, so as to permit attachment of lever arm portions only on mounting hub portions of drive shafts, which correspond to vote selections to be registered. When a lever arm portion is removed from its mounting hub portion, the latter is fully shielded from voter view and fraudulent or unintended manipulation of its drive shaft prevented.

BACKGROUND AND GENERAL DESCRIPTION OF THE INVENTION

This application is a continuation-in-part of my prior application for a Precision Pointer for Voting Machines or the like, Ser. No. 780,134, filed Nov. 29, 1968, now Pat. No. 3,491,942, and is specifically directed towards a voting pointer and cover device construction which permits the lever arm portion of the pointer to be selectively mounted only on vote registering drive shafts corresponding to vote selections to be registered.

In accordance with the present invention, the drive shafts are provided adjacent their ends with mounting hub portions, which serve alternatively to provide non-voting "plug" shafts or to detachably mount the lever arm portions on the drive shafts. The cover device serves to shield the mounting portions in order to prevent their unauthorized use, while preventing unauthorized or unintentional removal of the lever arm portion from the drive shafts. The cover devices are in turn removably locked in place by a locking bar to which only a machine custodian may gain access.

DRAWINGS

FIG. 1 is a fragmentary front elevational view of a voting machine front panel embodying the present invention depicting two of a multiplicity of available voting pointers as having been levered down into "voted" positions. The view also shows one office-candidate vacancy on the panel format with the lever arm portion of the associated pointer construction removed to expose its mounting hub portion;

DETAILED DESCRIPTION

Figures 1, 2:
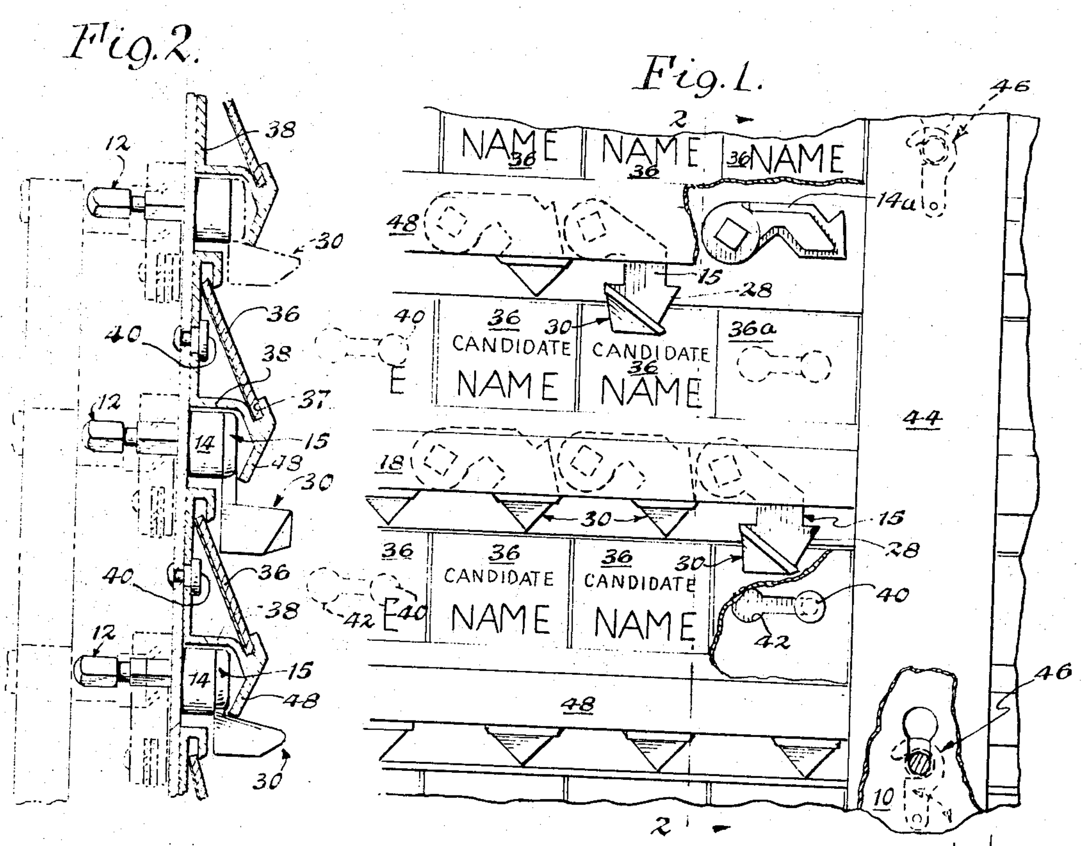
FIG. 2 is a fragmentary sectional view taken as indicated by line 2—2 of FIG. 1.

As shown in FIGS. 1 and 2, the invention may be embodied to advantage in a voting machine having a front panel or plate 10, through which are pivotally journaled a plurality of rows of voting pointer drive shafts 12 in accordance with conventional voting machine construction practice. It is to be understood that the end of drive shafts 12, which project rearwardly of panel 10 are connected to appropriate vote registering, interlock mechanisms and the like, as generally indicated at FIG. 2.

Keyed to or formed integrally with the forwardly extending or front ends of drive shafts 12 are mounting hub portions 14, which are adapted to releasably support lever arm portions 15. When portions 14 and 15 are interconnected in the manner to be described, they cooperate to form voting pointers arranged to sweep the front surface of panel 10 when manually manipulated by a voter to indicate his voting preference.

Figures 3, 4:
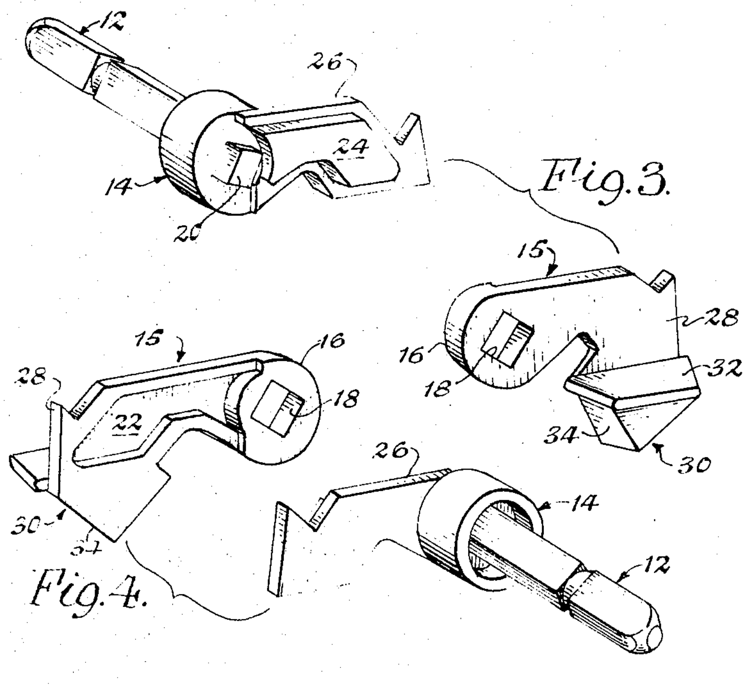
FIGS. 3 and 4 are front and rear exploded perspective views, respectively, on slightly enlarged scale, of one of the pointers of the invention when disassembled from the machine.
Figure 5:
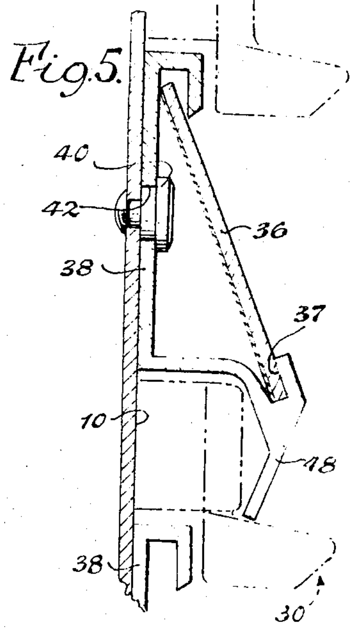
FIG. 5 is an enlarged view of the cover device shown in FIG. 2.

As best shown in FIGS. 3 and 4, lever arm portion 15 is of "dog-leg" configuration and terminates at one end thereof in a hub portion 16, which is provided with a through opening 18 adapted to frictionally receive stud 20 of mounting hub portion 14. The rear surface of lever arm portion 15, which extends radially of hub portion 16, is provided with recess 22 adapted to receive a like-configurated projection 24 carried by mounting hub portion extension 26. Thus, when lever arm portion 15 is moved toward mounting hub portion 14 in a direction axially of drive shaft 12, mounting stud 20 and projection 24 may be frictionally received within opening 18 and recess 22 for the purpose of removably interconnecting the lever arm to the mounting hub for rotation with drive shaft 12.

Lever arm portion 15 terminates at its other end in a main arrowhead shaped end portion 28, having a pull tab or flange device 30 extending forwardly from one angular side thereof. Pull tab 30 includes a forwardly extending, flat land surface or ledge 32 against which a voter's finger may be placed to effect pivoting of the pointer into a vote selection position, as will be more fully hereinafter described. Pull tab 30 also includes a front view arrowhead shaped portion 34, which points away therefrom in a direction normal to the plane of ledge 32.

As will be apparent from viewing FIGS. 1 and 2, drive shafts 12 are journaled on front plate 10 in a horizontally and vertically coordinated row and column arrangement in association one with each of a plurality of vote selection indicia plaques 36, which may if desired be formed separately or in strip form. In accordance with the preferred embodiment of the present invention, indicia plaques 36 are removably carried within channels 37 of horizontally disposed cover devices or guide plates 38, which are preferably constructed so as to dispose the indicia plaques at an angle of inclination relative to front panel 10 necessary to provide optimum reading facility. Cover devices 38 may be of any suitable construction, such as for instance metal or plastic extrusions.

Cover devices 38 are removably fixed to front panel 10 by suitable means, such as by panel mounting headed pins 40, which are removably received within cover device key-shaped slot openings 42. A locking bar 44, which is removably mounted on front panel 10 by fasteners 46 to which only a machine custodian may gain access through the rear of the voting machine, is employed to simultaneously maintain all of cover devices 38 in their locked position, illustrated in FIG. 1, wherein headed pins 40 are disposed adjacent the narrow ends of slot openings 42. When the machine custodian wishes to remove one of cover devices 38 for the purpose of changing indicia plaques 36 or obtaining access to the voting pointers, he must first release fasteners 46 to permit removal of the locking bar, which when removed permits the cover device to be removed to the right, as viewed in FIG. 1, into its release position, wherein the enlarged ends of slot openings 42 are disposed in registration with headed pins 40.

Each of cover devices 38 is formed adjacent the lower edge thereof with a forwardly and downwardly extending flange portion 48, which is adapted to overlie the projecting ends of a horizontal row of drive shafts 12. The elements thus far described are arranged such that when the voting pointers are retracted or swung upwardly into their "non-voting" positions, all portions of the pointers are concealed within the space between front panel 10 and cover device flange 48, except for their associated pull tabs 30, which project from such space downwardly beneath cover device flanges 48 and point directly toward the indicia plaque corresponding thereto.

When a voter approaches the machine in preparation for the voting operation, all of the pointers will of course have been previously retracted into their concealed or "non-voting positions. However, pull tabs 30 will clearly indicate to the voter just which pointers should be pulled in order to register his intended vote selections. Then, when a pointer is pulled down by the voters manual manipulation, of its pull tab, as shown by way of example in two instances in FIG. 1, the main arrowhead shaped end portion 28 of lever arm portion 15 will be pivoted downwardly from behind cover device flange 48 into its '"voted" position. When in this position, the main arrowehead shaped end portion points directly at its corresponding indicia plaque, so as to visually confirm to the voter that his intended selection has been registered.

When in the ballot format for a given election, vacancies occur in any row of office or candidate names or in an area reserved for voting propositions, voting pointers in positions corresponding to each such vacancies will be removed by the machine custodian during programming of the machine prior to election. To remove a voting pointer, the machine custodian must first remove its overlying cover device and thereafter pull the appropriate lever arm portion from its mounting hub, as indicated in the case of mounting hub 14*a* in FIG. 1.

Indicia plaques associated with ballot format vacancies may be merely omitted or be blank cards, as indicated at 36*a* in FIG. 1. Upon the subsequent mounting of its associated cover device, mounting hub 14*a* is shielded from view by cover device flange 48. Due to the narrow opening defined by the bottom of flange 48 and the top edge of an immediately adjacent lower cover device, mounting hub portion 14*a* is comparatively inaccessible and thus fraudulent or unintentional manipulation of its associated drive shaft is prevented.

It will be understood that when cover devices 38 are locked in place in the manner described, they readily permit pivotal movement of the pointers, while serving to prevent removal of their lever arm portions from their associated mounting hubs.

It will be apparent that various modifications of the preferred embodiment of the present invention, which has been described in detail, may be made without departing from the present invention. Exemplary thereof would be to re-arrange the format of the front panel of the voting machine, such that the voting pointers are disposed in vertically extending rows and the indicia plaques with which they are associated are carried by vertically extending cover devices. Also, means other than channel recesses formed in the cover devices may be employed to mount the indicia plaques on the front panel of the voting machine.

What is claimed is:

1. In a voting machine or the like, having a front panel and vote registering means disposed rearwardly of said front panel, the combination comprising:

means adapted to carry vote selection indicia;

means to mount said indicia carrying means adjacent the front of said front panel such that said indicia is in visual disposition thereon;

a cover device;

means to removably mount said cover device on said front panel adjacent said indicia carrying means, said cover device when mounted having a portion thereof disposed relatively in front of said indicia carrying means so as to define a space opening in the direction of said indicia carrying means; and a pointer mounted for pivotal movement relative to said indicia carrying means so as to be manually movable within said space between non-voted and voted positions, said pointer including a rotatable drive shaft portion adapted to be coupled to said vote registering means, a mounting hub portion fixed for rotation with an end of said drive shaft portion extending forwardly through said front panel and a lever arm portion, said mounting hub portion and said lever arm portion having cooperating means adapted to effect removable interlocking thereof for rotational movement with said drive shaft portion when said lever arm portion is moved axially of said drive shaft portion into mounting engagement with said mounting hub portion, said lever arm portion being dog-leg shaped in front view and terminating at its free end in a main arrowhead shaped portion having at one angular side thereof a forwardly extending pull tab device, said lever arm portion when mounted on said mounting hub porton being disposed behind said cover device whereby when said pointer is in non-voted position said lever mounting hub portion and said arm portion are shielded from voter view while said pull tab device visably projects from said space beyond cover device and points toward the indicia on said indicia carrying means corresponding to the vote selection which will be registered upon pulling against said pull tab device so as to move said pointer into voted position, said cover device when mounted preventing movement of said lever arm portion axially of said drive shaft from interlocking engagement with said mounting hub portion, and said main arrowhead shaped end portion when said pointer is moved into voted position being caused to exit from said space behind said cover device and to point directly at said indicia thereby visually confirming to the voter that his intended vote selection has been made.

2. A machine frame according to claim 1, wherein there is provided pluralities of rows of drive shafts, cover devices and indicia carrying means, said rows of drive shafts being arranged in alternating relationship with said indicia carrying means, and at least one of said cover devices comprising simultaneously a mounting for one of said indicia carrying means and a voter view shield for lever arm portions of pointers carried by an adjacent row of drive shafts.

3. A machine frame according to claim 1, wherein said mounting means for each said cover device includes at least a pair of pin means carried on one of said front panel and cover device, and at least a pair of key-shaped slot means provided in the other of said front panel and cover device, each said cover device being movable relative to said front panel such that in a first position of said cover device said pin and slot means cooperated to lock said cover device on said front panel and in a second position of said cover device said pin and slot means cooperated to permit removal of said cover device from said front panel;

locking bar means; and means accessible only to a custodian of said machine from rearwardly of said front panel for releasably securing said bar means to said front panel, said bar means when secured maintaining said cover device in said first position thereof and when released permitting movement of said cover device to said second position thereof.

4. A machine frame according to claim 1, wherein each said mounting hub portion includes a hub fixed to said shaft and an arm portion extending radially therefrom, said hub and arm portions having projections extending in a direction axially of said shaft, and each said lever arm portion having recesses adapted to receive said projections such as to interlock said lever arm portion to said hub and arm portions for rotational movement about the axis of said drive shaft.

References Cited

UNITED STATES PATENTS

| | | | |
|---|---|---|---|
| 1,031,355 | 1/1912 | Abbott | 235—54 |
| 1,363,885 | 12/1920 | Lausterer | 235—51 |
| 2,091,590 | 8/1937 | Gustauson | 235—51 |
| 2,346,962 | 4/1944 | Gustauson | 235—54 |
| 3,170,623 | 2/1965 | Shoup | 235—54 |

RICHARD B. WILKINSON, Primary Examiner

S. A. WAL, Assistant Examiner

U.S. Cl. X.R.

116—136.5

UNITED STATES PATENT OFFICE
CERTIFICATE OF CORRECTION

Patent No. 3,539,776 Dated November 10, 1970

Inventor(s) Michael T. Moldovan, Jr.

It is certified that error appears in the above-identified patent and that said Letters Patent are hereby corrected as shown below:

In the heading to the printed specification, line 8, "683,933" should read -- 863,933 --. Column 3, line 44, "arrowehead" should read -- arrowhead --.

Signed and sealed this 4th day of May 1971.

(SEAL)
Attest:

EDWARD M.FLETCHER,JR.
Attesting Officer

WILLIAM E. SCHUYLER,
Commissioner of Paten

FORM PO-1050 (10-69)